United States Patent [19]
Dawson

[11] Patent Number: 4,969,035
[45] Date of Patent: Nov. 6, 1990

[54] OBSERVATION OF FURNACE INTERIOR

[75] Inventor: David I. Dawson, Sheffield, United Kingdom

[73] Assignee: British Steel plc, London, England

[21] Appl. No.: 451,172

[22] Filed: Dec. 15, 1989

[30] Foreign Application Priority Data

Dec. 20, 1988 [GB] United Kingdom ............... 8829695

[51] Int. Cl.⁵ .............................................. H04N 7/18
[52] U.S. Cl. .................................. 358/100; 358/229; 358/901
[58] Field of Search .................. 358/100, 901, 229

[56] References Cited

U.S. PATENT DOCUMENTS

| | | | |
|---|---|---|---|
| 3,609,236 | 9/1971 | Hellman | 358/100 |
| 4,022,530 | 5/1977 | Braun | 356/312 |
| 4,112,763 | 9/1978 | Pirlet | 350/61 |
| 4,432,286 | 2/1984 | Witte | 358/100 |
| 4,539,588 | 9/1985 | Ariessohn | 358/100 |
| 4,749,171 | 6/1988 | Arima et al. | 266/44 |
| 4,820,046 | 4/1989 | Sohma | 356/328 |

FOREIGN PATENT DOCUMENTS

| | | |
|---|---|---|
| 61-56255 | 3/1986 | Japan . |
| 696434 | 9/1953 | United Kingdom . |
| 1002351 | 8/1965 | United Kingdom . |
| 1495229 | 12/1977 | United Kingdom . |

*Primary Examiner*—Howard W. Britton
*Attorney, Agent, or Firm*—Bacon & Thomas

[57] ABSTRACT

This invention provides a method of observing the interior of a furnace by viewing, at a remote location, the image depicted by a pinhole camera sited in or within the furnace housing. The image may be real and viewed directly or via a reflective or fibre optic transmission system, or alternatively a video camera may be employed, in this instance the 'screen' of the camera may be constituted by light responsive elements, e.g. charge coupled devices. The camera may typically be sited in the furnace wall or roof and a pressurized blast of air or an inert gas, e.g. nitrogen or argon, may be employed for maintaining the integrity of the pinhole.

8 Claims, 2 Drawing Sheets

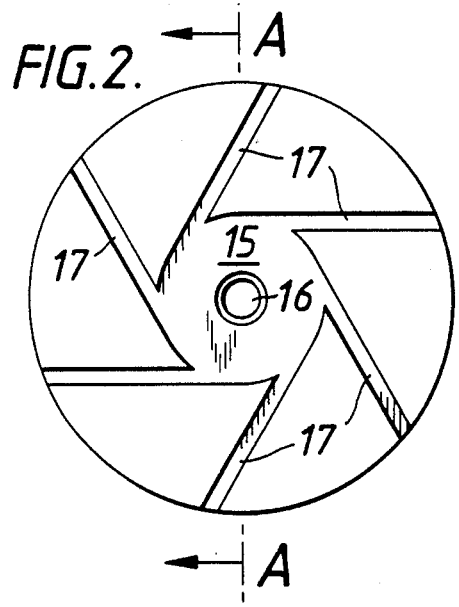
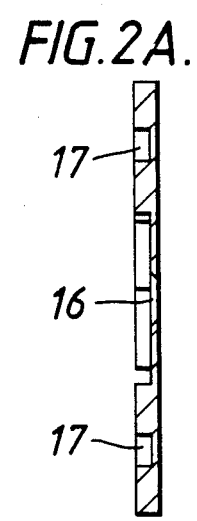
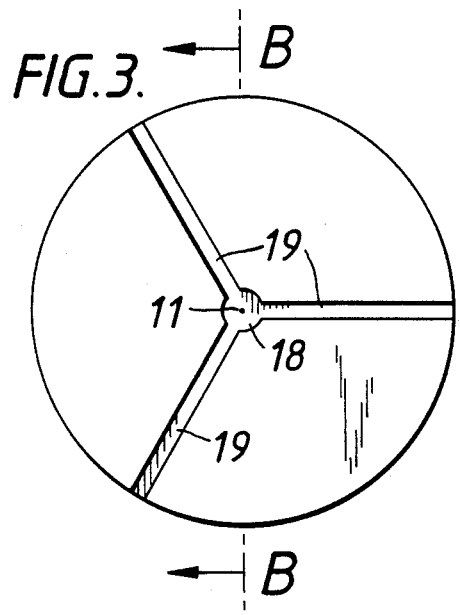
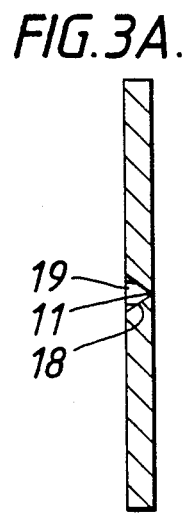

OBSERVATION OF FURNACE INTERIOR

This invention relates to the observation of furnace interiors, e.g. iron and steelmaking (melting) or steel processing furnaces.

Observation of the interior of a furnace is of inestimable value in determining process parameters and the condition of the charge within the furnace, and the furnace structure itself. However, the use of conventional cameras utilising a lens is virtually impossible by reason of the hostile environment encountered; it is an object of this invention therefore to provide an improved method and apparatus for such an observation.

From one aspect the invention provides a method of observing the interior of a furnace by viewing, at a remote location, the image depicted by a pinhole camera sited in or within the furnace housing.

The image may be real and viewed directly or via a reflective or fibre optic transmission system, or alternatively a video camera may be employed, in this instance the 'screen' of the camera may be constituted by light responsive elements, e.g. charge coupled devices.

The invention also provides apparatus for observing the interior of a furnace comprising a pinhole camera sited in or within the furnace housing, and means for reproducing for viewing at a remote location the image depicted.

The camera may be sited in the furnace wall or roof, or blast furnace raceway etc. or alternatively it may be sited in a projectable boom or even in an interiorly disposed furnace component, e.g. a non-consumable electrode in an arc furnace. The whole apparatus may be water-cooled and a pressurised blast of air or an inert gas, e.g. nitrogen or argon, may be employed for maintaining the integrity of the pinhole.

In order that the invention may be fully understood one embodiment thereof will now be described, by way of example, with reference to the accompanying drawings, in which:

FIG. 2 is a plan view of one component of the pinhole 'plate';

FIG. 2A is a section on A—A in FIG. 2;

FIG. 3 is a plan view of another component of the pinhole plate;

FIG. 3A is a section on B—B in FIG. 3; and

Figure 1:
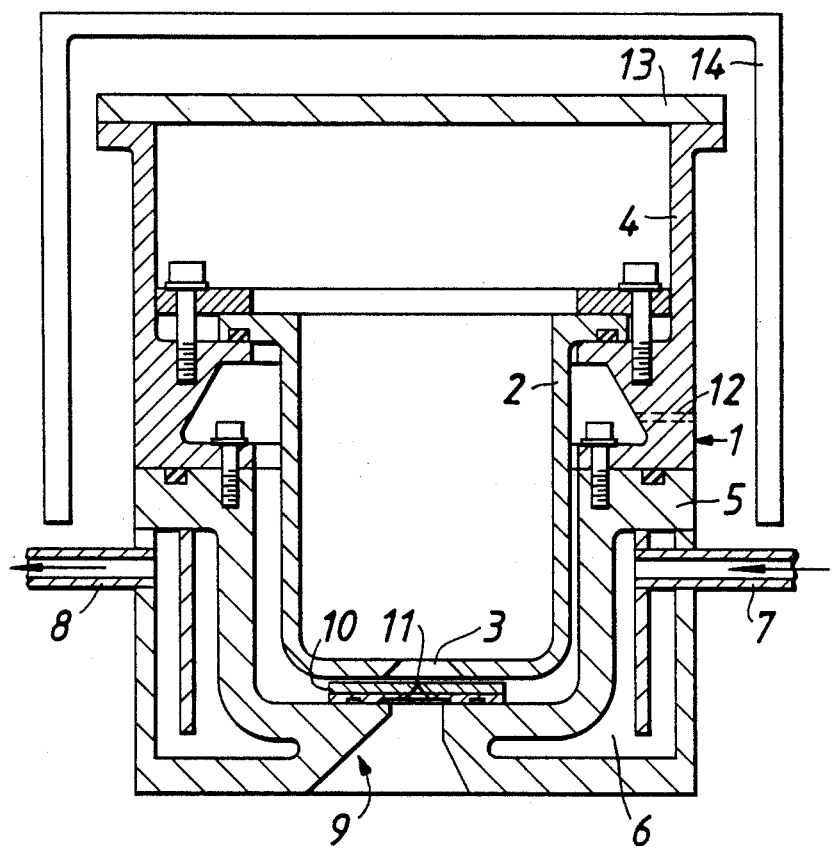
FIG. 1 is a sectional side elevation through the pinhole camera/video camera housing and mounting.

Referring now to the drawings the mounting 1 for the camera is sited in and extends through, say, the water-cooled or refractory lined roof of a furnace, e.g. a ladle furnace for treating molten steel. In particular, a cup-shaped housing 2 for an optical or video camera (not shown) having an acrylic window 3 is sealed and fastened within an upper part 4 of the mounting, the lower part 5 of which defines a baffled cavity 6 through which water is channelled via inlet port 7 and outlet port 8. This part 5 has a centrally disposed tapered cavity 9 and sited between the inner side of this part and the housing 2 is a composite plate 10 which has a central pinhole aperture 11 exposed to view by the cavity 9. The space defined between the housing 2 and the lower part 5, defines a passage for, e.g. filtered compressed air injected through an inlet port 12 and which exits through the pinhole aperture 11. The mounting 1 is itself sealed by a dust cover 13 to protect the video camera and the whole unit is enveloped by a radiation shield and protective cover 14 sited on the furnace roof.

Figure 4:
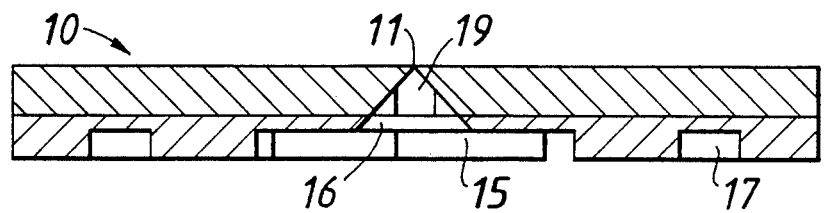
FIG. 4 is a sectional side elevation of the composite plate.

The pinhole plate 10 is shown in more detail in FIGS. 2 to 4. More particularly, this comprises two components. One, shown in FIG. 2, embodies a circular-section recess 15 from which extends a wide tapered bore 16. A number of channels 17 extend into the recess 15 substantially tangentially thereof. The other component, shown in FIG. 3, has a central tapered cavity 18 defining at its extremity the 'pinhole' 11 and a number of radially disposed channels 19 extend into the cavity 18. The diameter of the pinhole aperture may typically be between 0.15 mm and say 0.5 mm.

The two components are assembled together as shown in FIG. 4.

In operation, the water cooling jacket ensures that the structure can withstand the elevated temperature of the furnace and the air flow through the pinhole aperture (downwardly through the space between the head of the plate 10 and the acrylic window 3) and the tangential flow through channels 17 and radial flow through channels 19 ensures that the pinhole aperture is maintained free from debris thrown up within the furnace which might otherwise obscure it.

In the illustration shown the centre line of the pinhole aperture and the centre line of the video camera are offset from one another giving an effective viewing axis of about 10° away from the wall of the furnace—which in this example is considered to be on the right hand side of FIG. 1—to give a more informative view.

It is understood that the embodiment shown is just one example of the invention and that various modifications may be made without departing from the scope of this invention. For example, as mentioned the provision of a video camera within the site of the pinhole housing itself is not essential, the image could be depicted on e.g, a ground glass screen at this site and viewed remotely. Further, historical diagnosis may be effected by utilising a camera/recorder system. Image enhancement facilities may also be utilised and of course the camera may respond to wavelengths outside the visible spectrum, particularly infra red for thermal imaging. The design of the pinhole plate may also be different from that shown consistent with maintaining an adequate gas flow through the pinhole to maintain its integrity. Moreover, although air may be the favoured gaseous medium, should combustion or oxidation problems occur then, for example, argon or nitrogen may be used. The gas pressure may likewise vary depending upon the furnace activity; it will need to be higher in an aggressive environment such as a melting furnace than a more passive environment met in, say, a soaking pit.

More than one camera may be sited in, or within, the furnace housing so that an observer may be presented with a more comprehensive series of pictures.

We claim:

1. A method of observing the interior of a furnace comprising viewing, at a remote location, an image depicted by a pinhole camera sited in or within the furnace housing, wherein the image is real and is viewed via a reflective or fibre optic transmission system.

2. A method according to claim 1 wherein the image energises elements in the camera responsive to a defined frequency spectra and wherein the image is reproduced at said remote location through electrical signal transmission.

3. Apparatus for observing the interior of a furnace comprising a pinhole camera sited in or within the furnace housing and means for reproducing for viewing at a remote location the image depicted comprising elements in the camera responsive to a defined frequency spectra and an electrical signal transmission system for reproducing said image at the remote location.

4. Apparatus for observing the interior of a furnace comprising a pinhole camera sited in or within the furnace housing and means for reproducing for viewing at a remote location the image depicted comprising elements in the camera responsive to a defined frequency spectra and an electrical signal transmission system for reproducing said image at the remote location wherein the camera comprises an inner housing having a sealed aperture aligned with an open aperture in an outer housing and a plate disposed between said apertures in which a pinhole is defined and through which extend rays emanating from the furnace, the rays irradiating the elements mounted within the inner housing.

5. Apparatus according to claim 4, in which the inner housing aperture is sealed by a transparent medium, the said rays lying in the visible spectrum and the said elements being light responsive.

6. Apparatus according to claim 4, in which the pinhole is cleansed by a gas jet.

7. Apparatus according to claim 6, in which the plate embodies a number of channels through which the gas jet is transmitted to describe flow paths conducive to a cleansing action.

8. Apparatus according to claim 7, in which the plate comprises two parts, one embodying a conical cavity terminating in the pinhole with channels extending radially from the cavity, and another embodying channels extending tangentially from the periphery of a circular-section recess coaxial with said cavity.

* * * * *